June 19, 1951 G. PETERSON 2,557,310

OSCILLATOR CIRCUIT

Filed May 17, 1948

INVENTOR.
GLEN PETERSON

BY Hudson & Young

ATTORNEYS

Patented June 19, 1951 2,557,310

UNITED STATES PATENT OFFICE 2,557,310

OSCILLATOR CIRCUIT

Glen Peterson, Tulsa, Okla., assignor to Phillips Petroleum Company, a corporation of Delaware Application May 17, 1948, Serial No. 27,590

4 Claims. (Cl. 250—36)

This invention relates to electronic oscillator circuits. In a more specific aspect, it relates to piezo-electric crystal oscillators for producing high frequency signals suitable for use in a radio seismic or other communication system.

In a radio seismic system, an explosive charge is detonated at a shot point causing seismic waves to be propagated through the earth which are picked up and converted into electrical energy by a large number of geophone units spaced in a predetermined configuration with respect to the shot point. A radio transmitter is provided at the shot point for producing a radio signal at the instant the shot is fired and a transmitter is also located at each geophone station for producing radio waves representative of the seismic waves reaching such geophone station as a result of the detonation at the shot point. The signals from all these transmitters are picked up by a multi-channel receiver and the signals from all the channels are recorded by a common amplifier-recorder unit.

The use of such a radio seismic system involves providing a number of radio transmitters of closely adjacent frequencies and the radio channels assigned for such work are ordinarily in the high frequency portion of the radio spectrum. The use of such closely spaced frequencies necessitates the provision of oscillators having a high degree of stability so as to eliminate interference between adjacent signals. Quartz or piezo-electric crystals are known to give a high degree of stability to the transmitted signal but many difficulties are encountered when it is attempted to use piezo-electric crystals in the high frequency portion of the radio spectrum. These difficulties result largely from the circuits utilized at high frequencies and from the mechanical means employed for holding the crystals rather than from inherent limitations in the oscillation of the crystals. Thus, crystals are available when use is made of harmonic modes of vibration having frequencies as high as 75 megacycles and the oscillator associated with such a crystal may be tuned to the 3rd, 5th, 7th, or even as high as the 15th harmonic of the crystal frequency. However, with circuits previously utilized at such frequencies with piezo-electric crystals, the oscillations have been very weak. It has been necessary to use special means of mounting the crystals, and the adjustment of the circuit elements has been very critical, particularly when a circuit was utilized having sufficient simplicity for practical and commercial operations.

I have found that these difficulties experienced with prior circuits and highly specialized crystal holders can be substantially eliminated by the use of a crystal oscillator utilizing a two-tube or push-pull circuit and that a sufficient power output may be obtained at a high frequency by the use of such circuit as to reduce to a minimum the required number of radio frequency amplification stages. I have further discovered that the use of such push-pull or two-tube circuit eliminates difficulties in neutralizing the subsequent radio frequency amplifiers. The crystal oscillator of the present invention produces high energy outputs at the highest practical harmonic of the crystal without danger of mechanical damage to the crystal and is easy to adjust in the region of frequencies controlled by the crystal. Such a circuit, of course, utilizes the inherent frequency stability of the crystal so that a large number of signals may be transmitted in a narrow high frequency band without interference between adjacent signals.

It is an object of the invention to provide an oscillator circuit of great frequency stability which is adaptable for use in the high frequency part of the radio spectrum.

It is a further object of the invention to provide a push-pull crystal oscillator which is capable of large power outputs, which is not critical in adjustment, and which greatly facilitates the problem of neutralizing the final or any intermediate stage of the transmitter.

It is a still further object of the invention to provide a crystal oscillator for use at high frequencies which is simple to construct, utilizes a minimum of circuit components, and is suitable for practical and commercial operation in a radio seismic system.

Various other objects, advantages and features of the invention will become apparent from the following description and disclosure taken in conjunction with the accompanying drawings, in which.

Figures 1, 2:
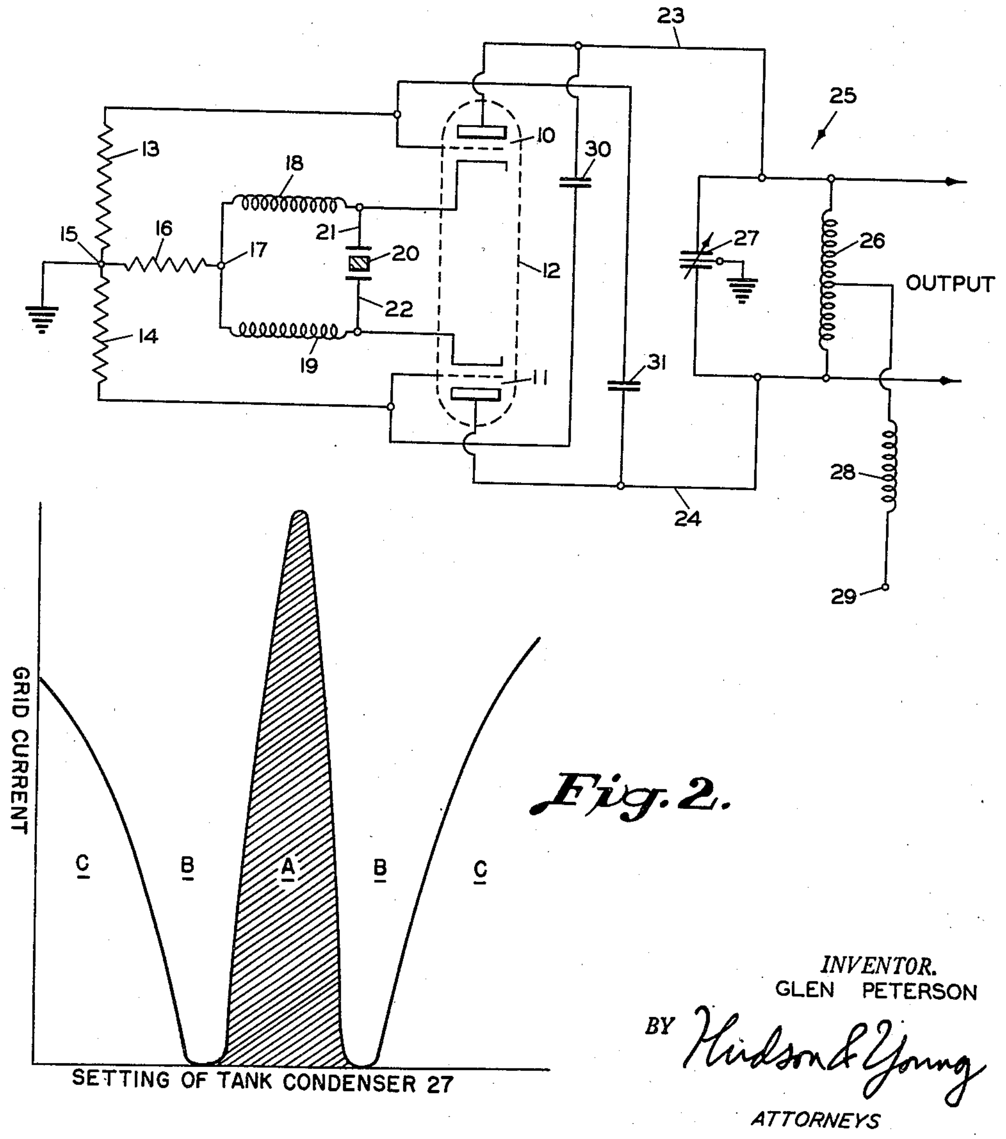
Figure 1 is a schematic circuit diagram of the novel oscillator circuit.
Figure 2 is a graph showing the relationship between oscillator grid current and the setting of the tank tuning condenser.

Referring now to the drawings in detail, the oscillator circuit comprises a pair of electron tubes 10 and 11, each of which has an anode, a cathode, and a control grid. The tubes 10 and 11 may be conveniently enclosed within a single envelope as indicated by the dotted line 12.

The control grids are connected, respectively, through load impedances 13, 14 to a grounded terminal 15 and these impedances are of equal value so as to provide a balanced circuit. Also connected to the terminal 15 is a bias resistor 16 which, in turn, is connected to a common terminal 17 of a pair of inductances 18 and 19, the ends of these inductances being connected to the respective cathodes of the electron tubes 10 and 11.

A piezo-electric crystal 20 is connected between the cathodes of tubes 10 and 11 by leads 21 and 22, respectively, and it will be observed that the inductances 18 and 19 are connected in shunt with the crystal. In effect, at the frequency of operation of the oscillator, the crystal 20 constitutes a sharply peaked series resonant circuit of very low impedance interconnecting the cathodes of the tubes. Accordingly, the current at the two cathodes is in phase due to the low impedance between the cathodes. At all other neighboring frequencies, the crystal presents a very high impedance between the cathodes. The exact manner in which the circuit operates is well illustrated by Figure 2 which is an experimental curve taken in the vicinity of 53 megacycles using a 12AU7 tube. The shaded area A of this curve represents a region of tank tuning in which the crystal controls the frequency of operation of the oscillator. Immediately adjacent this region, on either side, are regions B where no oscillations occur. Beyond each of these regions are other regions C where the circuit oscillates independently of the crystal. However, the latter frequencies are considerably removed from the frequency where the crystal is the controlling element.

The anodes of tubes 10 and 11 are connected by leads 23 and 24, respectively, to an output or tank circuit 25 comprising an inductance 26 shunted by a tuning condenser 27, the inductor 26 having a tap at the center thereof which is connected through a choke 28 to a positive power supply terminal 29. In this fashion, a direct current operating potential is applied to the tubes, a positive voltage being applied to the anodes through output circuit 25 and a negative voltage being applied to the cathodes through grounded terminal 15, bias resistor 16, and inductances 18 and 19.

In order to maintain the circuit in continuous oscillation, it is necessary to feed back a portion of the energy from the tank circuit to the grid-cathode circuits to offset energy losses in the oscillatory system. To this end, the anode of tube 10 is connected through a feed-back condenser 30 to the control grid of tube 11 while the anode of tube 11 is connected through a feed-back condenser 31 to the control grid of tube 10. As a result, sufficient energy of proper phase is fed from the output circuit 25 to the control grids to maintain the circuit in continuous oscillation.

In operation of the system at very high frequencies, the output circuit 25 is generally tuned by condenser 27 to a frequency which is an odd harmonic of the crystal fundamental frequency; however, operation at the fundamental frequency of the crystal is entirely possible and I intend to include the fundamental frequency by the expression "odd harmonic" in the specification and in the appended claims. When the output circuit is tuned in this manner, and operating potential is applied between terminals 15 and 29, the circuit oscillates at a frequency determined by the crystal. In fact, the effect of the crystal is so strong that the adjustment of tuning condenser 27 is not critical with the result that strong oscillations take place over a considerable tuning range, as illustrated by Figure 2.

The function of the inductances 18 and 19 is to permit direct current to be applied to the cathodes of tubes 10 and 11 while at the same time tuning the static capacity of the crystal and holder to anti-resonance. In this way, a very high impedance shunts the crystal at the operating frequency. For this purpose, it is generally convenient to make inductances 18 and 19 adjustable, although in manufacture they can be made to have the correct inductances, the values of which are not too critical. In this fashion, strong oscillations can be obtained at high harmonic frequencies of the crystal, since the inclusion of the electro-static capacity of the crystal and holder in an anti-resonant circuit essentially eliminates this element from the circuit.

The use of the crystal interconnecting the cathodes of the tubes is also advantageous in that the crystal is disposed in a low impedance portion of the circuit and, hence, may control the frequency of violent oscillations with out being fractured. Where a W. E. D–153,053 crystal is utilized together with a W. E. 2C51 twin triode of an RCA 12AU7 twin triode with 200 volts applied to the anode, more than 2 watts of power may be obtained from the tank circuit with an output voltage of about 150 volts R. M. S. Accordingly, ample power is available for feeding a final class C amplifier which may produce an output of as high as 10 watts. The balanced circuit also makes the neutralization of the class C stage a simple and routine process at frequencies as high as 160 megacycles. Thus, the novel oscillator circuit produces a high level of power output with very accurate frequency control which may be advantageously utilized in a radio seismic or other communication system.

While the invention has been described in connection with a present, preferred embodiment thereof, it is to be understood that this description is illustrative only and is not intended to limit the invention, the scope of which is defined by the appended claims.

Having described my invention, I claim:

1. A crystal oscillator unit comprising a pair of electron tubes each having an anode, a cathode, and a control grid, a grid-cathode circuit including a piezo-electric crystal interconnecting the cathodes of said tubes, and an impedance interconnecting said control grids, means for establishing a potential difference between the anode and cathode of each tube, an output circuit fed by the anodes of both tubes, and means for feeding back a portion of the energy of said output circuit to said grid-cathode circuit to offset energy losses therein thereby to effect continuous oscillation of said unit at a frequency determined by said crystal.

2. A crystal oscillator unit comprising a pair of electron tubes each having an anode, a cathode, and a control grid, a piezo-electric crystal interconnecting the cathodes of said tubes, balanced impedances interconnecting the control grids of said tubes, means including a current source and a dual radio frequency inductance unit shunted across said crystal for establishing a radio frequency potential difference between said cathodes, the midpoint of said inductance unit being connected to the midpoint of said balanced impedance, an output circuit fed by the anodes of both tubes, and means for feeding back a portion of the energy of said output circuit to said control grids to offset energy losses in the oscillatory circuit, thereby to effect continuous oscillation of said unit at a frequency determined by said crystal.

3. A crystal oscillator unit comprising a pair of electron tubes each having an anode, a cathode, and a control grid, a piezo-electric crystal interconnecting the cathodes of said tubes, a pair of series connected inductances shunted across said crystal, said inductances being anti-resonant with the electro-static capacity of the crystal and holder at the crystal frequency, a bias resistor interconnecting the common terminal of said chokes and a negative power supply terminal, a grid leak resistor connected between each control grid and said negative terminal, a tank circuit fed by the anodes of both tubes and tuned to a frequency which is an odd harmonic of the crystal frequency, means for connecting a positive power supply terminal to both of said anodes through said output circuit, and means for feeding back a portion of the energy of said output circuit to said control grids to effect continuous oscillation of said unit at a frequency which is an odd harmonic of the crystal frequency.

4. A crystal oscillator unit comprising a pair of electron tubes each having an anode, a cathode, and a control grid, a piezo-electric crystal interconnecting the cathodes of said tubes, a pair of series connected chokes shunted across said crystal, said chokes being anti-resonant with the capacity of the crystal and holder at the crystal frequency, a bias resistor interconnecting the common terminal of said chokes and a negative power supply terminal, a grid leak resistor connected between each control grid and said negative terminal, an output circuit including an inductance and a tuning condenser shunted across said inductance, means connecting the terminals of said inductance to the respective anodes of said tubes, means for connecting a positive power supply terminal to a center tap of said inductance, and a feed-back condenser connecting the anode of each tube with the control grid of the other tube.

GLEN PETERSON.

REFERENCES CITED

The following references are of record in the file of this patent:

UNITED STATES PATENTS

| Number | Name | Date |
|---|---|---|
| 2,252,941 | Mittelmann | Aug. 19, 1941 |
| 2,404,640 | Lawrance | July 23, 1946 |
| 2,438,595 | Zottu | Mar. 30 1948 |